United States Patent
Wong et al.

(10) Patent No.: US 7,040,561 B2
(45) Date of Patent: May 9, 2006

(54) SPICE GRINDER

(76) Inventors: Yan Kwong Wong, Unit 1016-17, 10/F, Metro Centre II, Lam Hing Street, Kowloon Bay, Kowloon (HK); Michael Wai Kwok Young, 45.28 11$^{th}$ St., Long Island City, NY (US) 11101; Wei Young, 45.28 11$^{th}$ St., Long Island City, NY (US) 11101

( * ) Notice: Subject to any disclaimer, the term of this patent is extended or adjusted under 35 U.S.C. 154(b) by 434 days.

(21) Appl. No.: 10/352,561

(22) Filed: Jan. 28, 2003

(65) Prior Publication Data

US 2003/0141395 A1 Jul. 31, 2003

(30) Foreign Application Priority Data

Jan. 28, 2002 (CN) ........................................ 02204365 U
Sep. 6, 2002 (CN) ........................................ 02252556 U (51) Int. Cl.
*B02C 7/00* (2006.01)
*B02C 7/08* (2006.01)
*B02C 7/14* (2006.01)

(52) U.S. Cl. ........................ 241/258; 241/168; 241/169; 241/169.1; 222/229

(58) Field of Classification Search ................. 241/168, 241/169, 169.1, 272, 258; 222/229
See application file for complete search history.

(56) References Cited

U.S. PATENT DOCUMENTS 526,203 A * 9/1894 Schwarzenberger ......... 241/162
597,077 A * 1/1898 Ackermann ................. 222/229
5,082,190 A * 1/1992 Chen ........................ 241/169.1
2001/0028007 A1 * 10/2001 Michel ........................ 241/169

FOREIGN PATENT DOCUMENTS

| CN | 1064606 A | 1/1992 |
|----|-----------|--------|
| CN | 2279136 Y | 4/1998 |
| CN | 2498966 Y | 10/2002 |

* cited by examiner

*Primary Examiner*—Allen Ostrager
*Assistant Examiner*—Jason Y Pahng
(74) *Attorney, Agent, or Firm*—Wyatt, Tarrant & Combs, L.L.P.

(57) ABSTRACT

A spice or peppercorn grinder including a cylinder body; an L-grooved barrel in the cylinder body; a top cap connected to a pressure drum slidably mounted in the L-grooved barrel, a rotatable ∞-shaped open-end long tube provided in a lower space of the pressure drum and engaged with a screw-shaped long axis assembly provided rotatably in the L-grooved barrel, so that when the ∞-shaped open-end long tube moves downwardly with the pressure drum, the screw-shaped long axis is caused to rotate in a certain direction, the other end of the screw-shaped long axis assembly being provided with a pinion; a compression spring being provided between the seat of the L-grooved barrel and the bottom of the pressure drum; a gear-toothed ring transmission mechanism being provided beneath the L-grooved barrel; a grinding plate assembly being provided on the cylinder bottom and being driven by the gear reduction apparatus to rotate in one direction to grind spices or peppercorns. The peppercorn grinder can be either operated with two hands or operated on a table with a single hand and can grind peppercorns only by pushing down the top cap gently. Moreover, the top cap can be free running of step change with a braking action relative to the pressure drum without interfering with normal operation.

9 Claims, 11 Drawing Sheets

SPICE GRINDER

The present application claims convention priority from Chinese patent applications nos 02204365.9 of Jan. 28, 2002 and 02252556.4 of Sep. 6, 2002.

BACKGROUND OF THE INVENTION

1. Field of the Invention

The invention relates to grinders, in particular to a spice or peppercorn grinder.

2. General Background of the Invention

At present, a generally available and commonly used peppercorn grinder is shaped like a long cylinder and require an operator to operate it with two hands. When using the conventional grinder, the operator grasps the cylinder body with one hand while it rotates and presses a top cap of the grinder with the other hand which forces peppercorns stored in the top cap to be pushed against a crushing plate in order to be crushed.

A main drawback of the above grinder is its operation requires the operator forcibly to rotate the top cap which is a more laborious work and is not suitable for elderly or weak persons. Further, the said grinder has been designed to be operated by two hands of an operator, which is very inconvenient for a disabled operator who may not be able to operate such a grinder.

Therefore, it would be desirable to improve the known spice or peppercorn grinder so that it can be operated with a single hand in an up-and-down pressing manner. Meanwhile, even if people habitually rotate the top cap in a conventional manner, it would be desirable to prevent the connection between the top cap and a pressing cylinder from being broken, since this may damage the peppercorn grinder.

SUMMARY OF THE INVENTION

In view of the foregoing, an object of the invention is to provide a spice grinder which can be either operated with two hands or operated on a table with a single hand and which allows a user to grind spices or peppercorns simply by repeatedly and gently pushing down a top cap of the grinder, thereby saving labor.

Another object of the invention is to provide a laborsaving spice grinder operated by an up-down pressing motion, a top cap of the grinder being capable of free or stepped rotation, so that rotation thereof does not damage the grinder.

In order to achieve the above objects, the invention provides a spice grinder comprising:

- a cylinder body with a top and a bottom, a cylinder cap being provided on the top and a cylinder bottom being detachably connected on the bottom; an L-grooved barrel in the cylinder body, the barrel having an L-groove on a side thereof and a stepped hole formed in a bottom thereof, the L-groove having a lower cross groove;
- a top cap connected with a pressure drum slidably mounted in the L-grooved barrel, the pressure drum being divided into an upper space and a lower space by a baffle, the lower space being closed by a cover plate, the baffle and the cover plate having a coaxial central through-hole, the pressure drum having a projection on its side, the projection being guided in the L-groove of the L-grooved barrel such that when it follows a rotation of the pressure drum it enters the lower cross groove of the L-groove, thus keeping the pressure drum in position;
- a ∞-shaped open-end long tube provided in the lower space of the pressure drum and being able to rotate in the pressure drum and the through-hole of the cover plate, the ∞-shaped open-end long tube having a flange that is upwardly and downwardly moveable in the lower space of the pressure drum such that when it reaches the cover plate of the pressure drum, its rotation is limited by a braking means provided between an upper surface of the flange and a lower surface of the baffle;
- a screw-shaped long axis assembly rotatably located in the stepped hole of the L-grooved barrel, a screw-shaped long axis on one end of the screw-shaped long axis assembly being engaged with an internal thread of the ∞-shaped open-end long tube, such that when the ∞-shaped open-end long tube moves downwardly with the pressure drum, the screw-shaped long axis is rotatable in one direction, and when the ∞-shaped open-end long tube moves upwardly with the pressure drum, the ∞-shaped open-end long tube is caused to rotate about the screw-shaped long axis in a reverse direction, an opposed end of the screw-shaped long axis assembly being provided with a pinion;
- a compression spring provided between a seat of the L-grooved barrel and a bottom of the pressure drum, the compression spring biasing the pressure drum upwardly;
- a gear-toothed ring transmission mechanism provided in the cylinder body and positioned under the L-grooved barrel, the transmission mechanism being connected transmissively with the pinion of the screw-shaped long axis assembly to obtain a driving force of high torsion moment; and
- a grinding plate assembly provided on the cylinder bottom, the grinding plate assembly being connected with the gear-toothed ring transmission mechanism and being driven by the gear-toothed ring transmission mechanism to rotate in one direction for grinding spices.

In the above-mentioned grinder, it is preferable to provide, between the top cap and the pressure drum, a top cap connecting device which can allow the top cap to rotate freely or in a stepped manner relative to the pressure drum, and thus to provide a braking action. Further, in the context of the use of the term "∞-shaped" herein, the term is used to describe the cross-section of the opening in the L-grooved barrel which receives the screw-shaped long axis for providing relative rotary motion. The actual cross-sections must be complementary to allow for sliding action however, may be varied in cross-section from rectangular to such as curved or bulbous lobes.

BRIEF DESCRIPTION OF THE DRAWINGS

For a better understanding of the present invention and to show how it may be carried into effect, reference shall now be made by way of example to the accompanying drawings, in which.

DETAILED DESCRIPTION OF THE PREFERRED EMBODIMENTS

Figure 1:
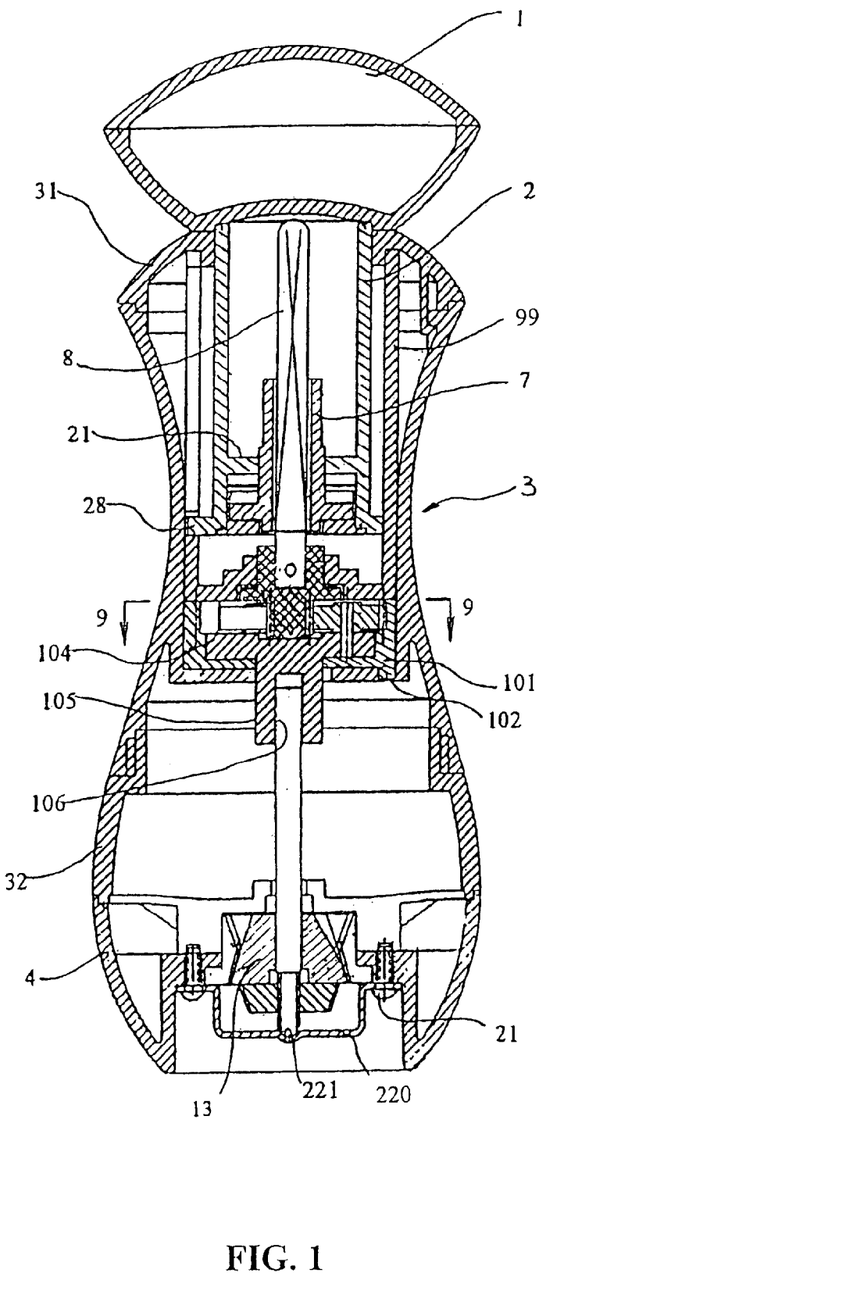
FIG. 1 is a longitudinal section view of a peppercorn grinder of the invention.
Figure 2:
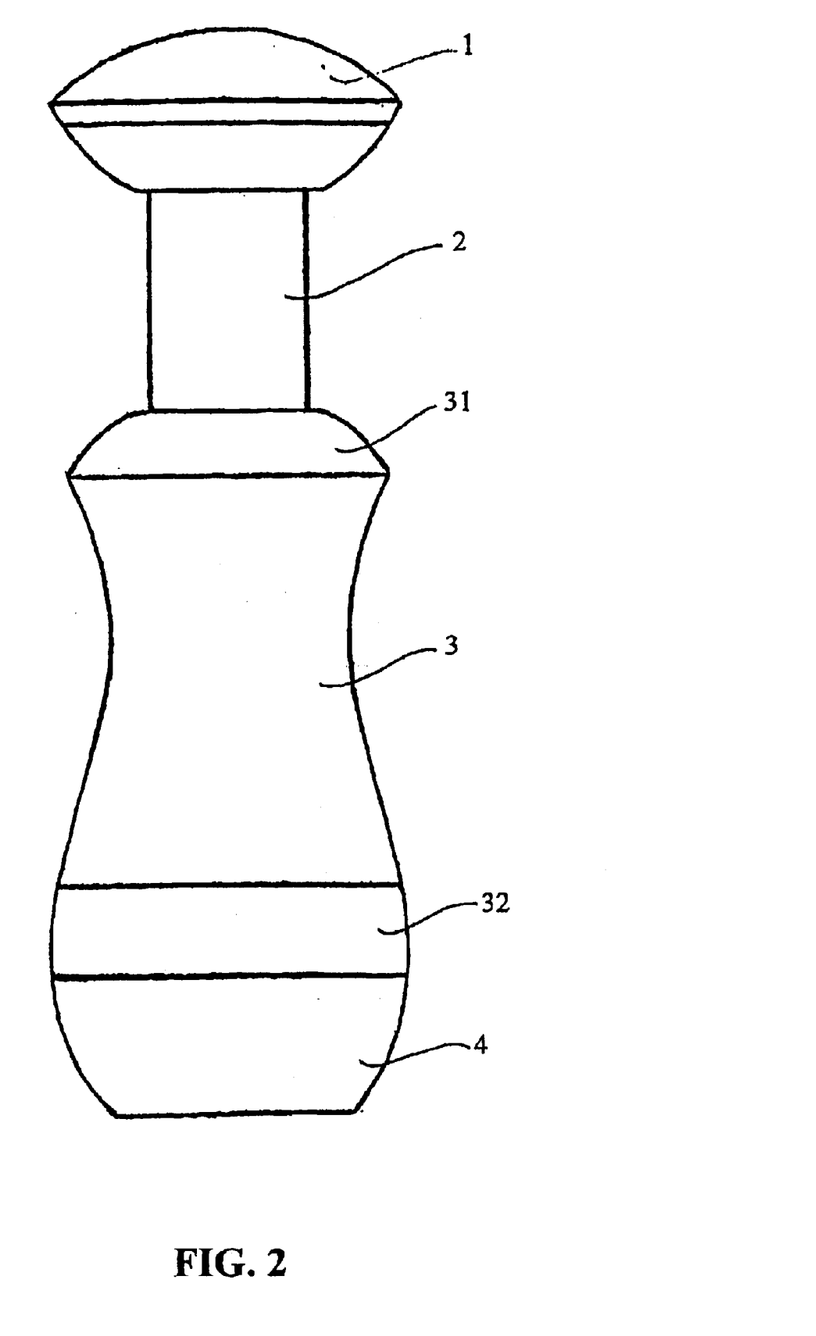
FIG. 2 is a front view of the peppercorn grinder of the invention.

Referring to FIG. 1 and FIG. 2, the main members of the peppercorn grinder according to the invention are shown. The peppercorn grinder comprises a top cap 1, a pressure drum 2 connected with the top cap 1, the pressure drum 2 being inserted into a cylinder body 3 provided on its outer surface with a curved portion for comfortable holding by a user, the cylinder body 3 being covered by a cylinder cover 31 and the cylinder body 3 being connected with a cylinder bottom 4 including a grinding plate. To use the grinder, a user first opens the cylinder body 3 and puts peppercorns or other spices into the grinding plate on the cylinder bottom 4. The cylinder body 3 is then remounted on the cylinder bottom 4 and the user may grind peppercorns or spices through pressing and moving the top cap 1 up and down. The lower part 32 of the cylinder body 3 may be formed as a transparent cylinder wall through which a state of the peppercorns or spices being ground in the cylinder may be observed.

Figure 3:
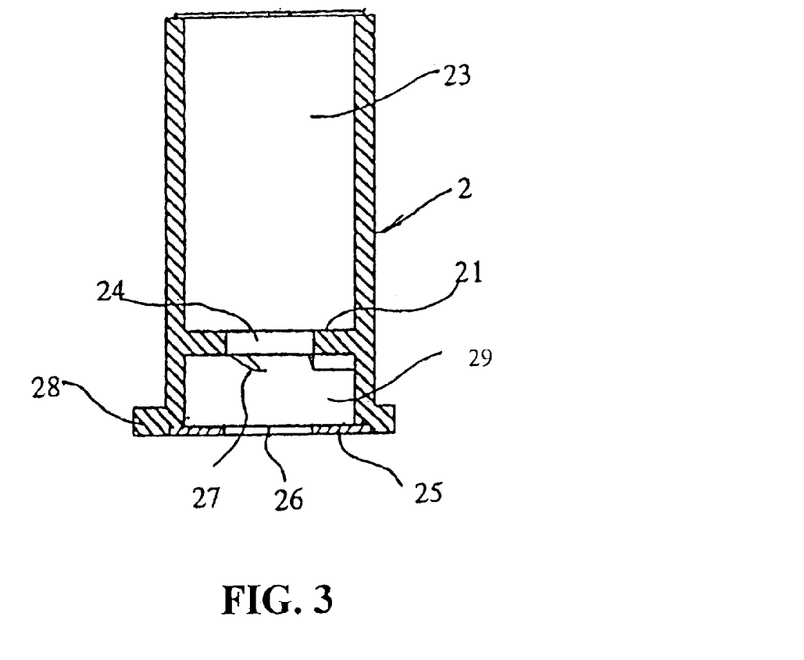
FIG. 3 is a sectional view of a pressure drum.

FIG. 3 is a sectional view of the pressure drum 2 which has both a lower space 29 and an upper space 23 divided by a baffle 21, the baffle 21 being provided with a hole 24 that allows a ∞-shaped open-end long tube to be positioned in the lower space 29 and kept in the lower space 29 by a cover plate 25 having a hole 26 that is coaxial with the hole 24. The baffle 21 is provided with a rib 27 on its bottom surface. A projection 28 is formed on the outer circumference of the bottom of the pressure drum 2.

Figure 4:
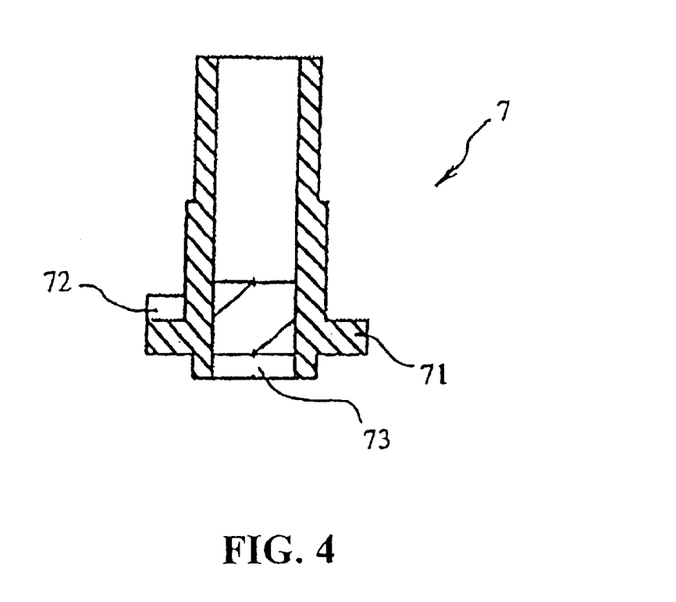
FIG. 4 is a sectional view of a ∞-shaped open-end long tube.

Referring to FIG. 4, the ∞-shaped open-end long tube 7 has a flange 71 near its bottom and the upper surface of the flange 71 is provided with a recess 72 which may match with the rib 27 in the lower space 29 of the pressure drum 2 such that when the ∞-shaped open-end long tube 7 is put in the lower space 29 of the pressure drum 2, the flange 71 on the ∞-shaped open-end long tube 7 may move up and down in the lower space 29, and when the flange 71 bears against the bottom surface of the cover plate 25 of the lower space 29, the rib 27 engages with the recess 72 to limit rotation of the ∞-shaped open-end long tube 7. The ∞-shaped open-end long tube 7 has a ∞-shaped opening 73.

Figure 5:
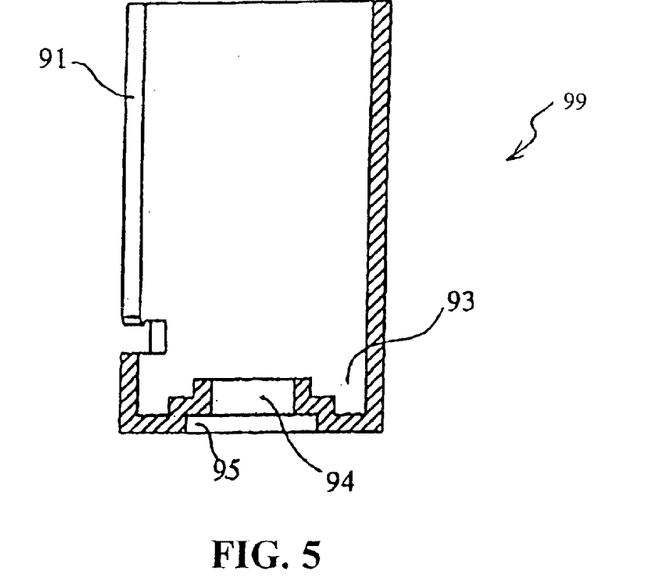
FIG. 5 is a sectional view of an L-grooved barrel.
Figure 6:
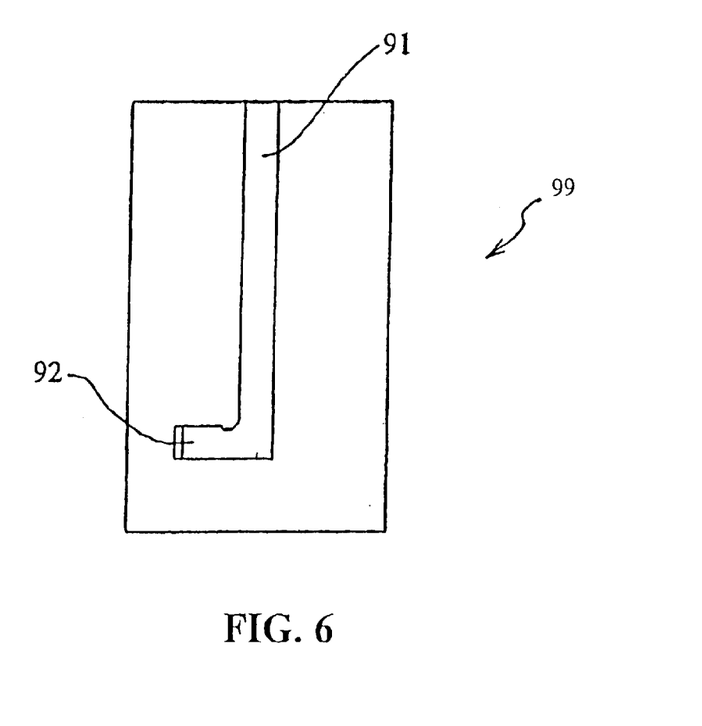
FIG. 6 is a side view of the L-grooved barrel.
Figure 7:
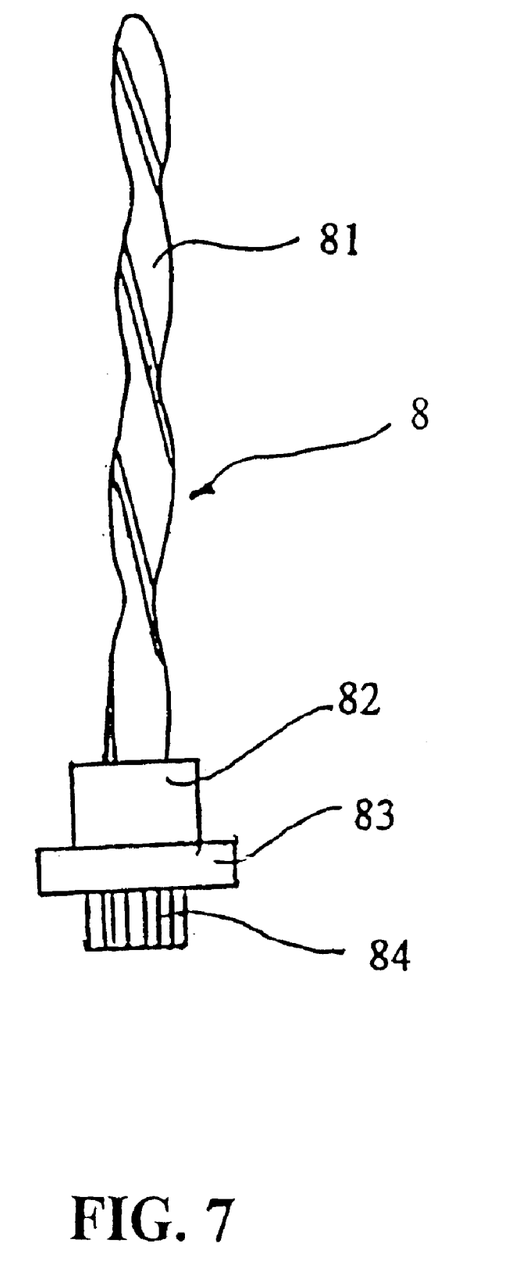
FIG. 7 is a front view of a screw-shaped long axis.

Referring to FIG. 5 and FIG. 6, an L-grooved barrel 99 has on its one side an L-groove comprising a vertical groove 91 and a lower cross groove 92. There is in the inner bottom of the L-grooved barrel 99 a recess 93 used to store a compression spring 5. Moreover, the L-grooved barrel 99 has a stepped circular hole 94 at a center of its bottom. When a long axis 81 of a screw-shaped long axis assembly 8 (see FIG. 7) passes through the stepped circular hole 94, a flange 83 of a connection seat 82 on a tail of the long axis 81 is just positioned on a stepped hole 95 of the stepped circular hole 94 and a pinion 84 on one end of the connection seat 82 emerges from the bottom surface of the L-grooved barrel 9.

Thus, the pressure drum 2 may be mounted on the L-grooved barrel 99, which has received the spring 5 and the screw-shaped long axis assembly 8. Then, the long axis 81 of the screw-shaped long axis assembly having passed the L-grooved barrel 99 may be inserted into the ∞-shaped opening 73 of the ∞-shaped open-end long tube 7 (see FIG. 4). In addition, the projection 28 on the bottom of the pressure drum 2 can be inserted along the vertical groove 91 of the L-groove in the L-grooved barrel 99. Therefore, when the top cap 1 is pressed down, the pressure drum 2 will move up and down along the L-grooved barrel 99 and cannot rotate. As for the function of the lower cross groove 92, it is used when the pressure drum 2 is pressed down and the projection 28 is transferred laterally into the lower cross groove 92 to lock the top cap 1 and the pressure drum 2 in the pressed down position when the grinder is not being used, which may provide space-saving advantages for storage.

Figure 8:
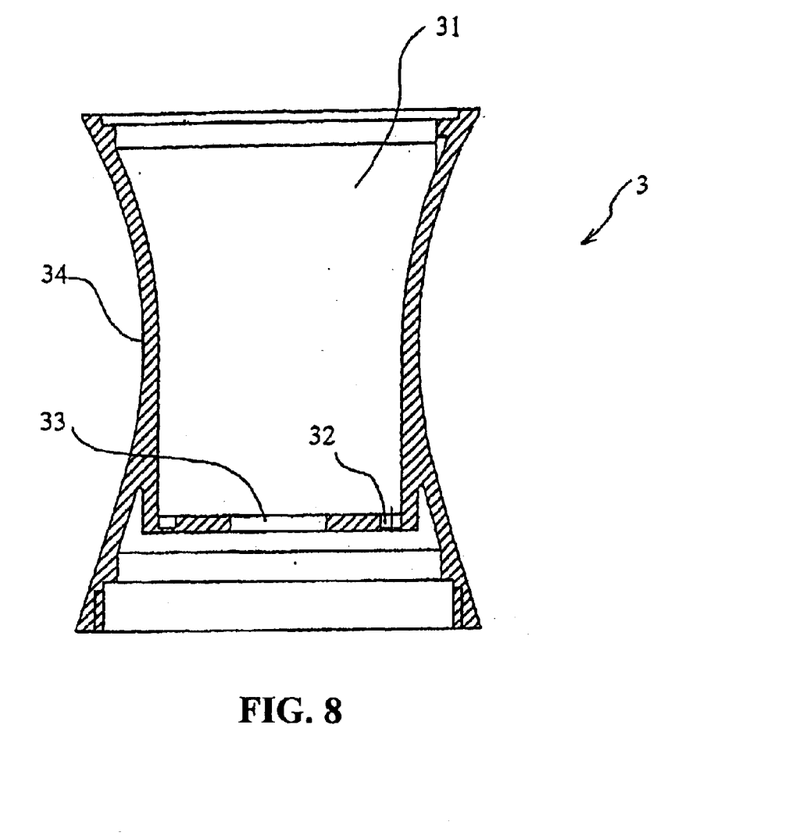
FIG. 8 is a sectional view of a cylinder body.
Figure 10:
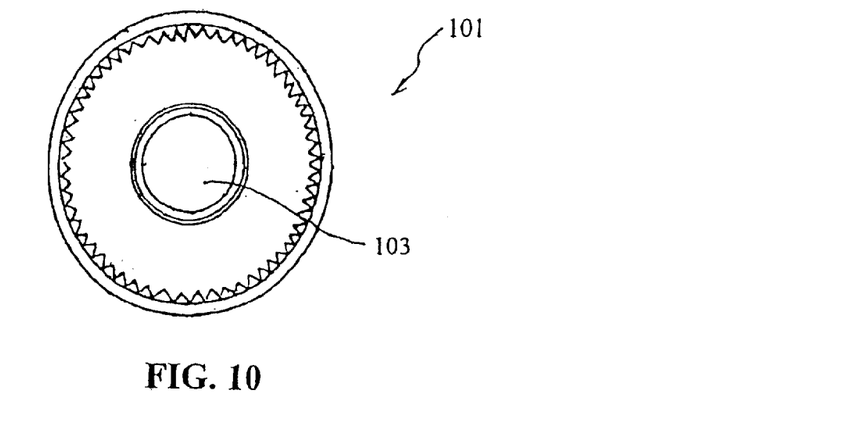
FIG. 10 is a top view of the toothed ring.

FIG. 8 is a sectional view of the cylinder body 3 in which a hollow cylinder portion 31 is used to receive the assembled L-grooved barrel 99. In the bottom of the hollow cylinder portion 31 of the cylinder body 3 there is provided a toothed ring 101 (see FIG. 10). Two positioning pins 102 on the bottom of the toothed ring 101 are inserted into two small holes 32 in the bottom of the cylinder body 3 respectively to fix the toothed ring 101 non-rotationally on the cylinder body 3. A circular hole 103 at the center of the toothed ring 101 is coaxial with a circular hole 33 of the cylinder body 3 and the cylinder body 3 has a curved outer circumference 34.

Figure 9:
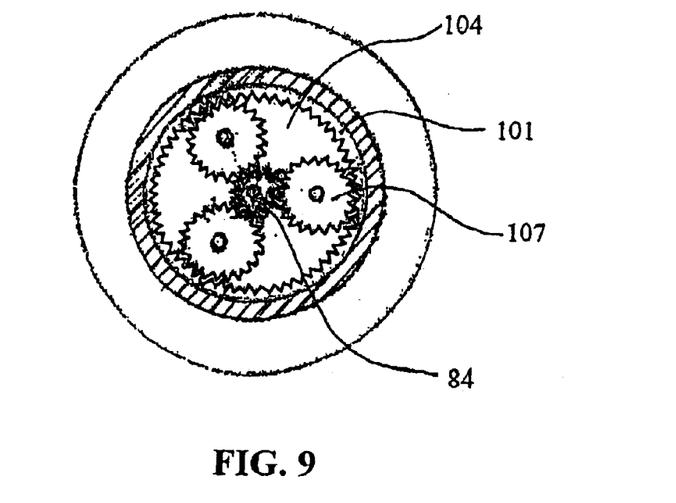
FIG. 9 is a sectional view taken along line 9—9 in FIG. 1, showing a gear-toothed ring transmission mechanism.

FIG. 9 is a sectional view taken along the line 9—9 of FIG. 1. A gear-toothed ring transmission mechanism 10 is shown in FIG. 9. The gear-toothed ring transmission mechanism 10 includes a toothed ring 101 and a rotary disk 104 rotatably mounted on an inner circumference of the toothed ring 101. A cylindrical long tube 105 on one side surface of the rotary disk 104 is rotatably provided in the circular hole 103 at the center of the toothed ring 101 and in the circular hole 33 in the bottom of the cylinder body 3. The cylindrical long tube 105 has an inner hole 106 of a square section.

There are three pinions 107 rotatably mounted on a side surface 104 of the rotary disk opposed to the cylindrical long tube 105. These three pinions 107 on the rotary disk 104 mesh respectively with the internal teeth of the toothed ring and simultaneously mesh together with the pinion 84 of the screw-shaped long axis assembly 8 positioned at the center of the rotary disk 104. The structure of gear transmission of the peppercorn or spice grinder has been described in the above.

Referring again to FIG. 1, the lower portion 32 of the cylinder body 3 is connected with the cylinder bottom 4 that is provided with the grinding plate assembly 13. By lifting the cylinder body 3, peppercorns or other spices may be put on the grinding plate assembly 13.

Figure 11:
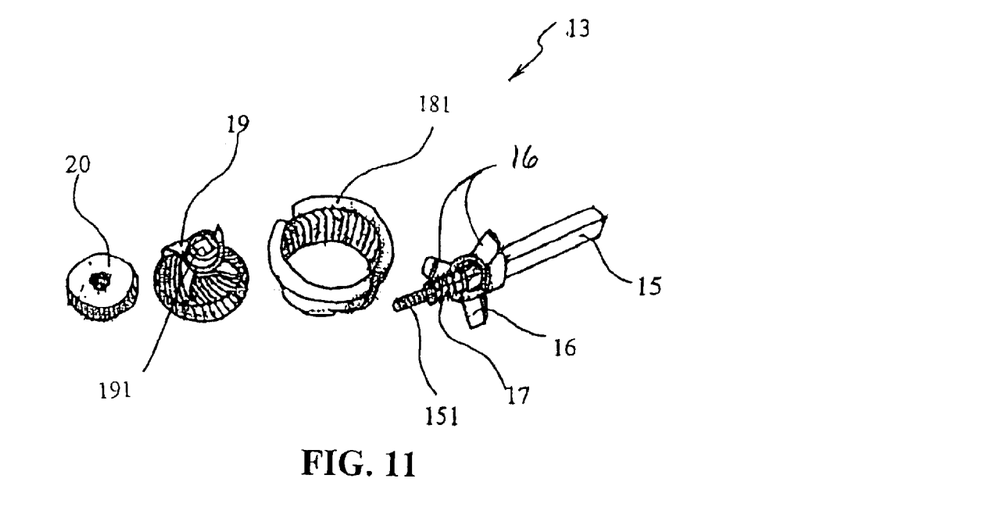
FIG. 11 is an exploded perspective view of a grinding plate assembly.
Figure 12:
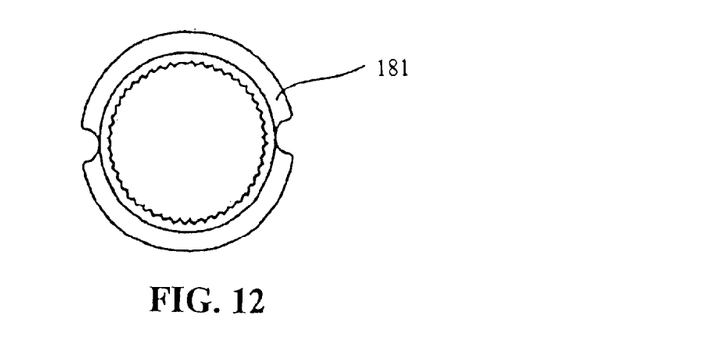
FIG. 12 is a top view of a toothed grinding pan.
Figure 13:
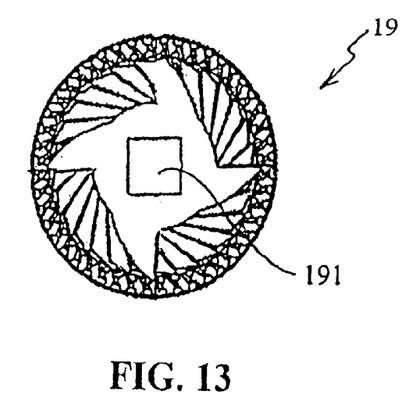
FIG. 13 is a top view of a screw pressure wheel.
Figure 14:
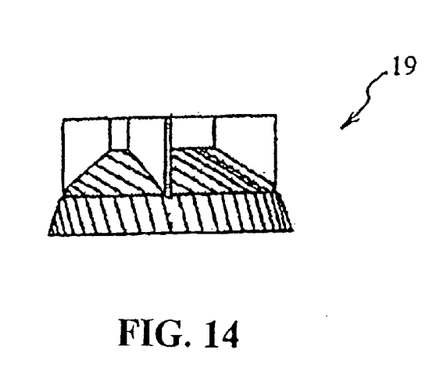
FIG. 14 is a side view of the screw pressure wheel.
Figure 15:
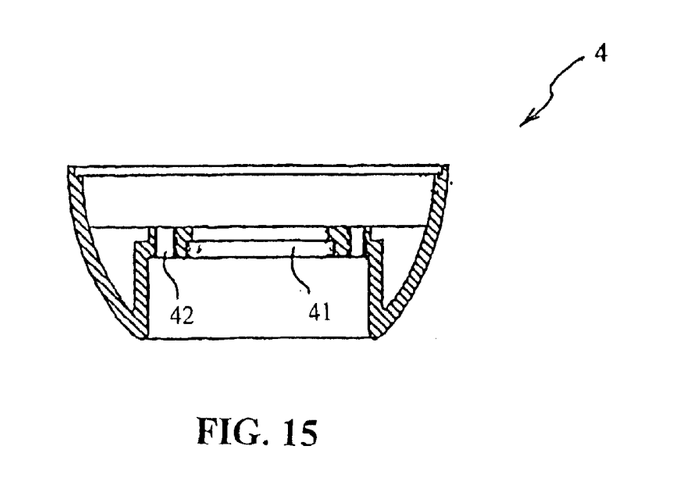
FIG. 15 is a sectional view of a cylinder bottom.

Referring to FIG. 11, the grinding plate assembly 13 includes a square shaft mandrel 15, a three-blade iron sheet 16, a small spring 17, a toothed grinding pan 181 with symmetric notches, a screw pressure wheel 19 and a locking block 20. When assembling the grinding plate assembly 13, firstly the small spring 17 is sleeved on the square shaft mandrel 15, then the square shaft mandrel 15 is passed through a circular hole at the center of the three-blade iron sheet 16 and the screw pressure wheel 19 is put in the toothed grinding pan 181 with symmetric notches. Next, a threaded end 151 of the square shaft mandrel 15 is inserted in a square hole 191 of the screw pressure wheel 19. Finally, a locking block 20 is screwed onto the threaded end 151 to prevent the screw pressure wheel 19 from falling out. The grinding plate assembly 13, after having been assembled, may be mounted in a stepped hole 41 of the cylinder bottom 4 (see FIG. 15). On either side of the center of the bottom of the cylinder bottom 4 there is respectively a screw hole 42. After the grinding plate assembly 13 has been put in the stepped hole 41 of the cylinder bottom 4, in order to prevent the grinding plate 13 from falling out, each of two screws 21 may be passed through a corresponding opening of an L-shaped iron sheet 220 then screwed in a corresponding screw hole 42 of the cylinder bottom 4 to fix the L-shaped iron sheet 220. The L-shaped iron sheet 220 has in its center a small recess 221 to support the threaded end 151 of the square shaft mandrel 15, and thus the grinding plate assembly 13 is fixed and will not be moved horizontally during its rotation which otherwise would decrease the grinding efficiency. Now, the whole structures of both the gear transmission and the grinding plate assembly have been already assembled.

When using the peppercorn grinder, one can open the connecting parts of the cylinder body 3 and the cylinder bottom 4, and put peppercorns on the grinding plate 13 before combining these two parts again together. When the top cap 1 is pressed down, the pressure drum 2 moves downward by means of the projection 28 being guided along the vertical groove 91 of the L-shaped groove on the L-grooved barrel 99 and presses the compression spring 5, meanwhile the ∞-shaped open-end long tube 7 received in the pressure drum 2 will be under the action of pushing the screw-shaped long axis 8 to cause the flange 71 of the ∞-shaped open-end long tube 7 to move upward and bear against the lower surface of the baffle 21 of the pressure drum 2, so that the rotation of the ∞-shaped open-end tube 7 is restricted and the screw-shaped long axis 8 can be rotated as the pressure drum 2 continues to be pushed downward. During this rotation, the pinion 81 on one end of the screw-shaped long axis 8 will also be rotated; however, as mentioned above, the pinion 81 meshes together with the three pinions 107 and so drives the three pinions 107 as well as the rotary disk 104 to rotate along the inner wall of the toothed ring 101.

The three pinions 107 drive the long tube with a square inner hole 106 so as to rotate through the rotary disk 104 and to drive the square shaft mandrel 15 in rotation so as to cause the peppercorns or spices to fall into a slot between the toothed grinding pan 181 and the screw pressure wheel 15 and to be crushed under rotation of the screw pressure wheel 19 so the effect of grinding peppercorns or spices can be realised.

In the above, the structure of an embodiment of a pressing-type grinder according to the invention has been described. In the structure shown in FIG. 1, the connection between the top cap 1 and the pressure drum 2 is fixed so that the top cap 1 cannot rotate relative to the pressure drum 2. If the top cap 1 is forcibly rotated, the connecting part between the top cap 1 and the pressure drum 2 may be broken or it may damage the inner members of the grinder.

Figure 16:
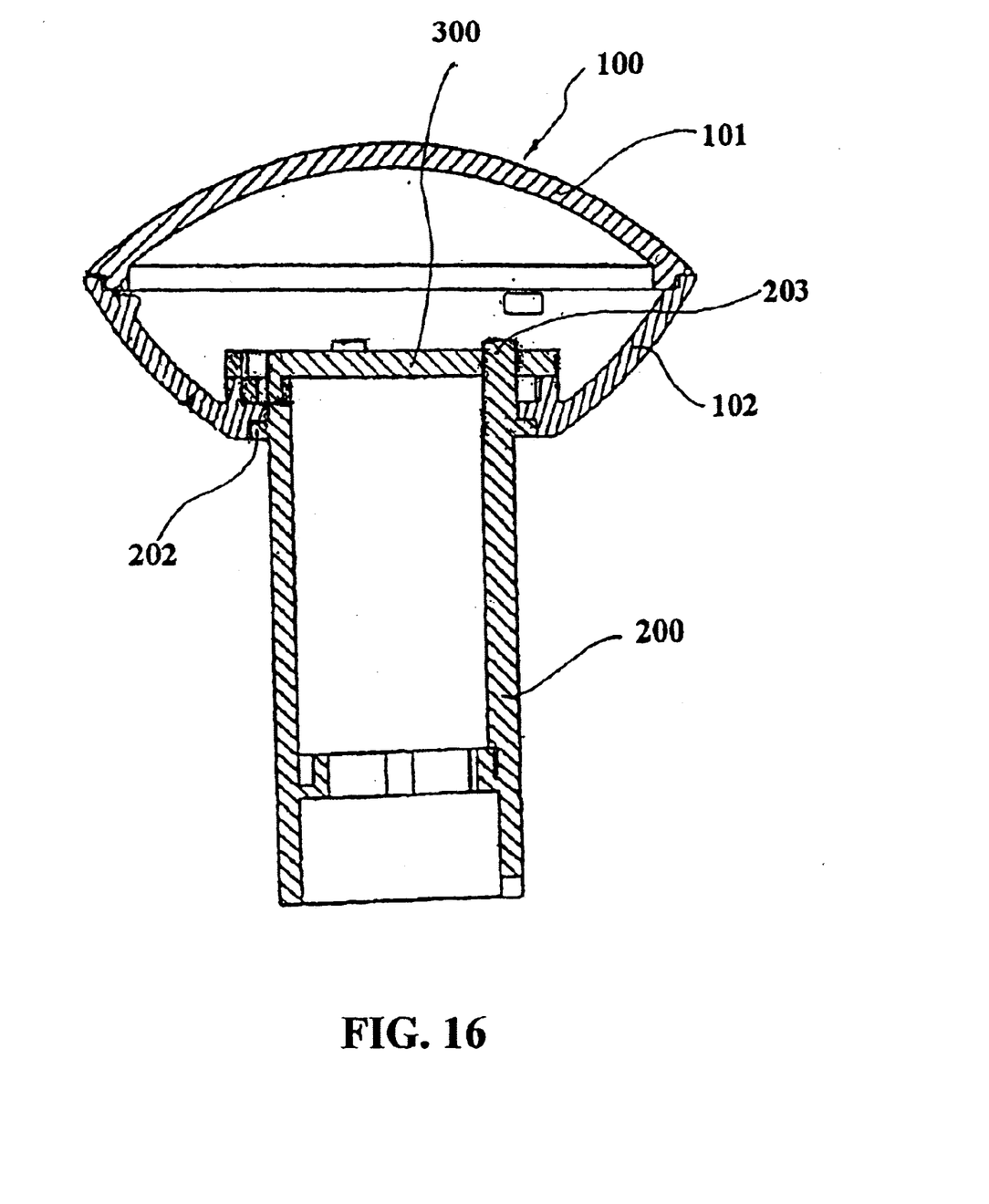
FIG. 16 is a sectional view of a top cap connecting device being capable of free running of step change according to an embodiment.

FIGS. 16–22 show an embodiment according to the invention wherein, in the connection structure of the top cap, the top cap is capable of free running of step change relative to the pressure drum. Referring to FIG. 16, a top cap 100 comprises an upper cap member 101 and a lower cap member 102, the two members being joined together along their outer circumferences either by means of a mutual fastening or an adhesive. A pressure drum 200 may be rotatably passed through the lower cap member 102 and then connected fixedly with a brake connection wheel 300. Through the engagement of the brake connection wheel 300 and the lower cap member 102, the top cap 100 may be free running of step change relative to the pressure drum 200 and have a braking action. The details of the members will be described in the following.

Figure 17:
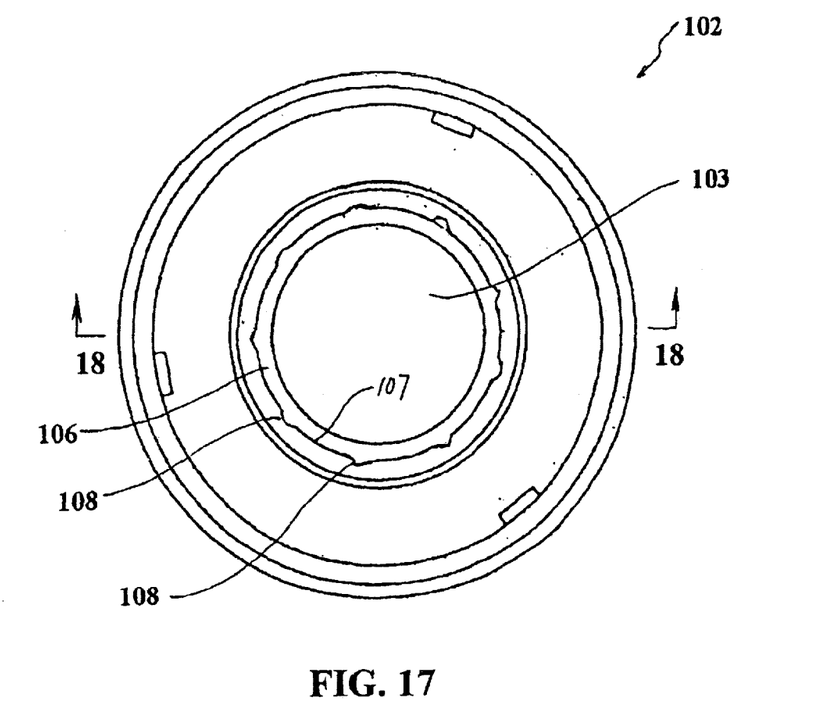
FIG. 17 is a top view of a lower cover of the top cap connecting device.
Figure 18:
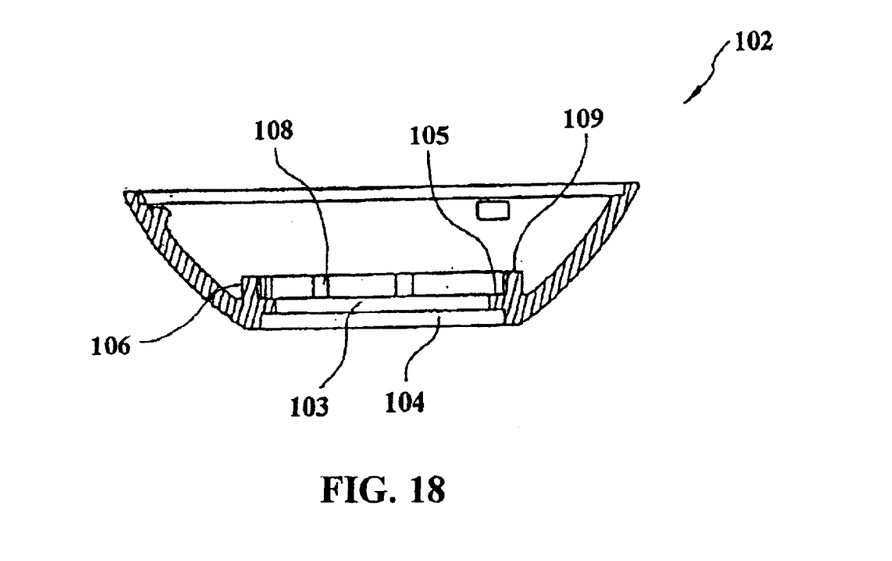
FIG. 18 is a sectional view taken along line 18—18 of FIG. 17.

FIG. 17 and FIG. 18 are respectively a longitudinal top view and a sectional view of the lower cap member 102 of the top cap 100. The bottom of lower cap member 102 has a circular hole 103, the undersurface of the bottom of the lower cap member 102 is provided with a stepped hole 104 being coaxial with the circular hole 103 and on the inner side surface 105 of the bottom of the lower cap member 102 there is formed a brake ring 106 that is coaxial with the circular hole 103. On an inner peripheral surface 107 of the brake ring 106 there are formed a plurality of small recesses 108 distributed equidistantly along a circumference. The number of the small recesses is unrestricted according to the invention and is nine, for example, in this embodiment as shown in FIG. 17. The shape of the section of the portion in the inner peripheral surface 107 between the recesses 108 may be an arc and is preferably a line for improving the brake effect. The brake ring 106 has a top surface 109.

Figures 19, 20:
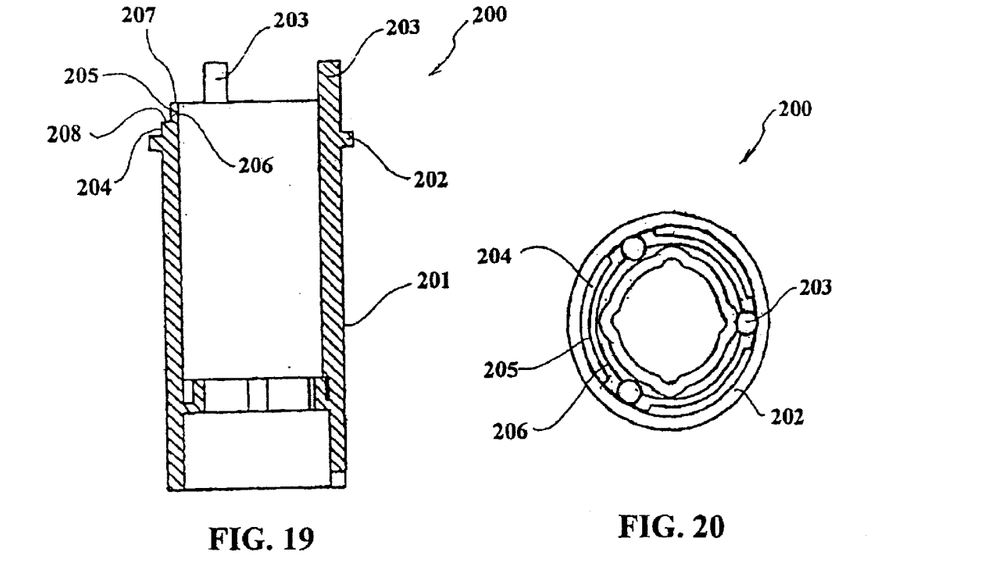
FIG. 19 is a longitudinal section view of a pressure drum connected with the top cap connecting device.
FIG. 20 is a top view of the pressure drum of FIG. 19.

FIG. 19 and FIG. 20 show respectively a longitudinal section view and a top view of the pressure drum 200 connected with the connection structure of the top cap shown in FIG. 16. The pressure drum 200 has a flange 202 near the top of the cylinder body 201 and the top of the pressure drum 200 has three cylindrical pins 203 distributed along the circumference equidistantly and projecting upwardly. A circular ring 204 is formed on the upper portion of the flange 202 and a small circular ring 206 with a diameter of its outer peripheral surface 205 being less than that of the circular ring 204 extends upwardly from the circular ring 204. The small circular ring 206 has a top surface 207. When the pressure drum 200 penetrates into the circular hole 103 from the bottom of the lower cap member 102, the flange 202 of the pressure drum 200 bears against the stepped hole 104 of the lower cap member 102, thus the circular ring 204 may rotatably engage with the circular hole 103 of the lower cap member 102, the upper surface 208 of the circular ring 204 lies flush with the inner surface 105 of the bottom of the lower cap member 102, and the top surface 207 of the small circular ring 206 lies flush with the top surface 109 of the brake ring 106 of the lower cap member 102.

Figure 21:
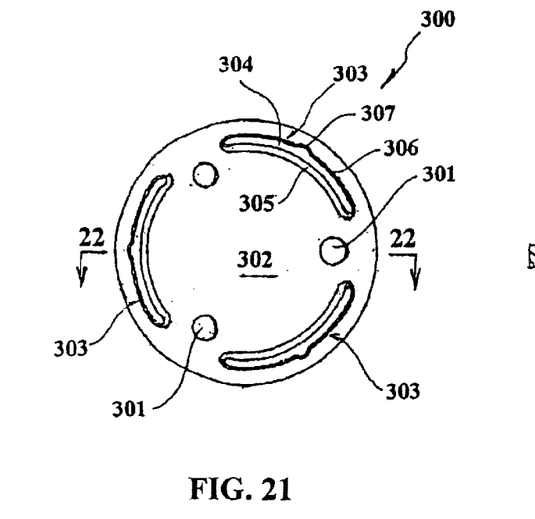
FIG. 21 is a plan view of an embodiment of a brake connection wheel for the top cap connecting device.
Figure 22:
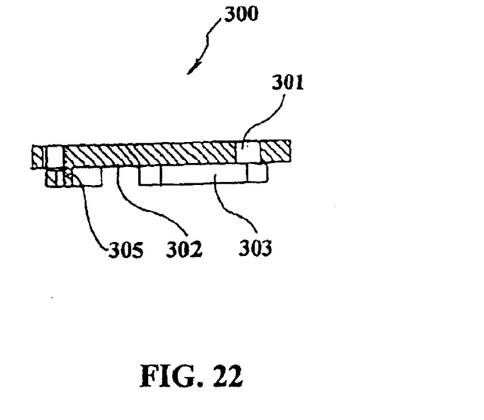
FIG. 22 is a sectional view taken long line 22—22 of FIG. 21.

FIG. 21 and FIG. 22 show respectively a plan view and a sectional view of the brake connection wheel 300. On the circular plate-like connection wheel 300 there are provided three mounting holes 301 distributed circumferentially and equidistantly which are formed to match with the three cylindrical pins 203 on the pressure drum 200 respectively. On the bottom surface 302 of the circular plate-like connection wheel 300 there is provided at least one segmental stub 303. In this embodiment there are shown three segmental stubs 303 and they are distributed circumferentially and equidistantly between each two of the three mounting holes 301. Each segmental stub 303 has a central long hole 304 with its inner arc side 305 integrally connecting with the bottom surface 302 of the connection wheel 300 and its outer arc side 306 separating from the bottom 302 of the connection wheel 300 for enhancing the elastic action of the outer arc side 306. The outer arc side 306 is designed to rotate in cooperation with the inner peripheral surface 107 of the brake ring 106 of the lower cap member 102. On the outer arc side 306 there is formed a projection 307 which may be snap-fitted with the small recess 108 of the brake ring 106.

Now referring again to FIG. 16, the assembling of the connection structure of the top cap is described. The pressure drum 200 penetrates into the circular hole 103 from the bottom of the lower cap member 102, the flange 202 of the pressure drum 200 bears against the stepped hole 104 of the lower cap cover 102 and the upper surface 208 of the circular ring 204 of the pressure drum 200 lies flush with an inner side surface 105 of the bottom of the lower cap member 102. The bottom surface 302 of the brake connection wheel 300 is disposed downwardly on the lower cap member 102 to cause each of the cylindrical pins 203 of the pressure drum 200 to insert into a corresponding mounting hole 301 of the connection wheel 300 and the segmental stub 303 of the connection wheel 300 is disposed in the space formed between the inner peripheral surface 107 of the brake ring 106 of the lower cap member 102 and the outer peripheral surface 205 of the small circular ring 206 of the pressure drum 200 to cause the bottom surface 302 of the connection wheel 300 to bear closely against the top surface 109 of the brake ring 106 of the lower cap member 102. After the assembling process described as above, the lower cap member 102, the pressure drum 200 and the brake connection wheel 300 will be connected together. The lower cap member 102 may rotate relative to both the pressure drum 200 and the connection wheel 300. By means of the elastic outer arc side 306 of the segmental stub 303 of the connection wheel 300 as well as the projection 307 on the elastic outer arc side 306 being snap-fitted with the small recess 108 in the brake ring 106 of the lower cap member 102, a certain brake action may be generated with respect to the relative rotation between the lower cap member 102 and the pressure drum 200. However, under a forcible action of the external force, the free running of step change will be realised. Thus, it is not only possible to prevent the top cap from arbitrarily unceasingly running free so as to interfere with the operation of grinding, but is also possible to prevent damage from being caused to the grinder due to any inadvertent rotation.

What is claimed is:

1. A spice grinder, comprising:
    a cylinder body with a top and a bottom, a cylinder cover being provided on the top and a cylinder bottom being detachably connected to the bottom;
    an L-grooved barrel in the cylinder body, the barrel having an L-groove on a side thereof and a stepped bole formed in a bottom thereof, the L-groove having a lower cross groove;
    a top cap;
    a pressure drum connected to the top cap, the pressure drum being slidably mounted in the L-grooved barrel, the pressure drum being divided into an upper space and a lower space by a baffle, the lower space being closed by a cover plate, the baffle and the cover plate having a coaxial central through-hole, the pressure drum having a projection on a circumferential side thereof, the projection being guided in the L-groove of the L-grooved barrel such that when it follows a rotation of the pressure drum it enters the lower cross groove of the L-groove, thus keeping the pressure drum in position;
    a ∞-shaped open-end long tube provided in the lower space of the pressure drum and being able to rotate in the pressure drum and the through hole of the cover plate, the ∞-shaped open-end long tube having a flange that is upwardly and downwardly moveable in the lower space of the pressure drum such that when it reaches the cover plate of the pressure drum, its rotation is limited by a braking means provided between an upper surface of the flange and a lower surface of the baffle;
    a screw-shaped long axis assembly rotatably located in the stepped hole of the L-grooved barrel, a screw-shaped long axis on one end of the screw-shaped long axis assembly being engaged with an internal thread of the ∞-shaped open-end long tube, such that when the ∞-shaped open-end long tube moves downwardly with the pressure drum, the screw-shaped long axis is rotatable in one direction, and when the ∞-shaped open-end long tube moves upwardly with the pressure drum, the ∞-shaped open-end long tube is caused to rotate about the screw-shaped long axis in a reverse direction, an opposed end of the screw-shaped long axis assembly being provided with a pinion;
    a compression spring provided between a seat of the L-grooved barrel and a bottom of the pressure drum, the compression spring biasing the pressure drum upwardly;
    a gear-toothed ring transmission mechanism provided in the cylinder body and positioned under the L-grooved barrel, the transmission mechanism connected transmissively with the pinion of the screw-shaped long axis assembly to obtain a driving force of high torsion moment; and
    a grinding plate assembly provided on the cylinder bottom, the grinding plate assembly being connected with the gear-toothed ring transmission mechanism and being driven by the gear-toothed ring transmission mechanism to rotate in one direction for grinding spices.

2. The grinder of claim 1, wherein the grinding plate assembly includes a square shaft mandrel, a three-blade iron sheet, a small spring, a toothed grinding pan with symmetric notches, a screw pressure wheel and a lock block, the square shaft mandrel being inserted in an inner square hole of the screw pressure wheel to cause the screw pressure wheel and the toothed grinding pan to rotate relative to each other.

3. The grinder of claim 1, wherein the gear-toothed ring transmission mechanism comprises:
    a toothed ring that is non-rotatably fixed on the cylinder body and is provided with a central hole, a rotary disk rotatably mounted on an inner circumference of the toothed ring, and three pinions rotatably mounted on an outer circumference of one side surface of the rotary disk, the three pinions meshing respectively with the internal teeth of the toothed ring while meshing together with the pinion of the screw-shaped long axis assembly, and there being provided, on a side surface opposed to the said one side surface of the rotary disk, a long tube having an inner square hole and rotatably passing through the central hole of the toothed ring.

4. The grinder of claim 1, wherein a lower part of the cylinder body has a transparent wall.

5. The grinder of claim 1, wherein the cylinder body has a curved outer circumference that is convenient to be grasped by hand.

6. The grinder of claim 1, wherein a connection structure of the top cap is provided between the top cap and the pressure drum, the connection structure being enabling the top cap to rotate freely or stepwise relative to the pressure drum and to have a braking action.

7. The grinder of claim 6, wherein the top cap comprises an upper cap member and a lower cap member combined together through a mutual snap-fitting fastening, the lower cap member comprising:
- a circular hole provided on a bottom of the lower cap member;
- a stepped hole that is coaxial with the circular hole and provided on an undersurface of the bottom of the lower cup member; and
- a brake ring provided on an inner side surface of the bottom of the lower cap member, and there being formed on an inner peripheral surface of the brake ring a plurality of small recesses distributed equidistantly along a circumference, a shape of a section of the portion of the inner peripheral surface between the recesses being a straight line-like connecting line for connecting the small recesses pairwise, and the brake ring having a top surface.

8. The grinder of claim 7, wherein the pressure drum comprises:
- a flange near the top of the cylinder body of the pressure drum, the flange being adapted to bear against the stepped hole of the bottom of the lower cap member;
- a circular ring formed on an upper portion of the flange, the circular ring having an upper surface and being adapted to be rotatably mounted on the circular hole of the bottom of the lower cap member with the upper surface of the circular ring lying flush with the inner side surface of the bottom of the lower cap member;
- three cylindrical pins distributed along the circumference equidistantly and projecting upwardly; and
- a small circular ring with a smaller diameter than the circular ring and extending upwardly from the upper surface of said circular ring.

9. The grinder of claim 8, wherein the connection structure of the top cap further comprises a brake connection wheel provided between the lower cap member of the top cap and the pressure drum, the brake connection wheel comprising:
- three mounting holes provided on a circular plate connection wheel and distributed circumferentially and equidistantly, these three mounting holes being adapted to cooperate with three cylindrical pins on the pressure drum for integrally combining the connection wheel and the pressure drum together, the lower cap member between the connection wheel and the pressure drum being caused to rotate about the circular ring of the pressure drum;
- three segmental stubs provided on a bottom surface of the circular plate connection wheel, the three segmental stubs being distributed circumferentially and equidistantly between each two of the three mounting holes, each segmental stub having a central long hole with an inner arc side integrally connecting with the bottom surface of the connection wheel and an outer arc side being separated from the bottom of the connection wheel, the connection wheel being adapted to rotate in cooperation with the inner peripheral surface of the brake ring of the lower cap member, and on the outer arc side there being formed a projection adapted to be snap-fitted in the small recess of the brake ring of the lower cap member by means of elastic action of the outer arc side.

* * * * *